US012592628B2

(12) United States Patent
Shu et al.

(10) Patent No.: US 12,592,628 B2
(45) Date of Patent: Mar. 31, 2026

(54) SOLID-STATE TRANSFORMER AND BUS VOLTAGE EQUALIZATION METHOD FOR SOLID-STATE TRANSFORMER

(71) Applicant: Huawei Digital Power Technologies Co., Ltd., Futian District (CN)

(72) Inventors: Zhou Shu, Dongguan (CN); Biao Ren, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 298 days.

(21) Appl. No.: 18/227,606

(22) Filed: Jul. 28, 2023

(65) Prior Publication Data

US 2023/0369959 A1 Nov. 16, 2023

Related U.S. Application Data

(63) Continuation of application No. PCT/CN2021/074367, filed on Jan. 29, 2021.

(51) Int. Cl.
H02M 1/00 (2007.01)
H02M 3/335 (2006.01)
H02M 7/483 (2007.01)

(52) U.S. Cl.
CPC ......... H02M 1/0074 (2021.05); H02M 1/007 (2021.05); H02M 3/33571 (2021.05); H02M 7/4833 (2021.05)

(58) Field of Classification Search
CPC .. H02M 1/007; H02M 1/0074; H02M 1/0077; H02M 3/33569–33592; H02M 7/4833; B60L 2210/10; B60L 2210/30
See application file for complete search history.

(56) References Cited

U.S. PATENT DOCUMENTS

2022/0094257 A1* 3/2022 Wang ..................... H02M 1/36

FOREIGN PATENT DOCUMENTS

| CN | 101674018 B | 11/2011 |
| CN | 103490638 A | 1/2014 |
| CN | 104811054 A | 7/2015 |
| EP | 3002864 A1 | 4/2016 |

* cited by examiner

*Primary Examiner* — Fred E Finch, III
(74) *Attorney, Agent, or Firm* — WOMBLE BOND DICKINSON (US) LLP

(57) ABSTRACT

This application provides a solid-state transformer and a bus voltage equalization method for a solid-state transformer. The solid-state transformer may include a plurality of cascaded modules and a bus voltage equalization module. Input terminals of all the cascaded modules are connected in series, and output terminals of all the cascaded modules are connected in parallel, and are used as a parallel output terminal of the solid-state transformer. The bus voltage equalization module is connected in parallel to the parallel output terminal of the solid-state transformer. Each cascaded module may include a bus capacitor (for example, all capacitors connected in series to each other on a direct current bus.

15 Claims, 6 Drawing Sheets

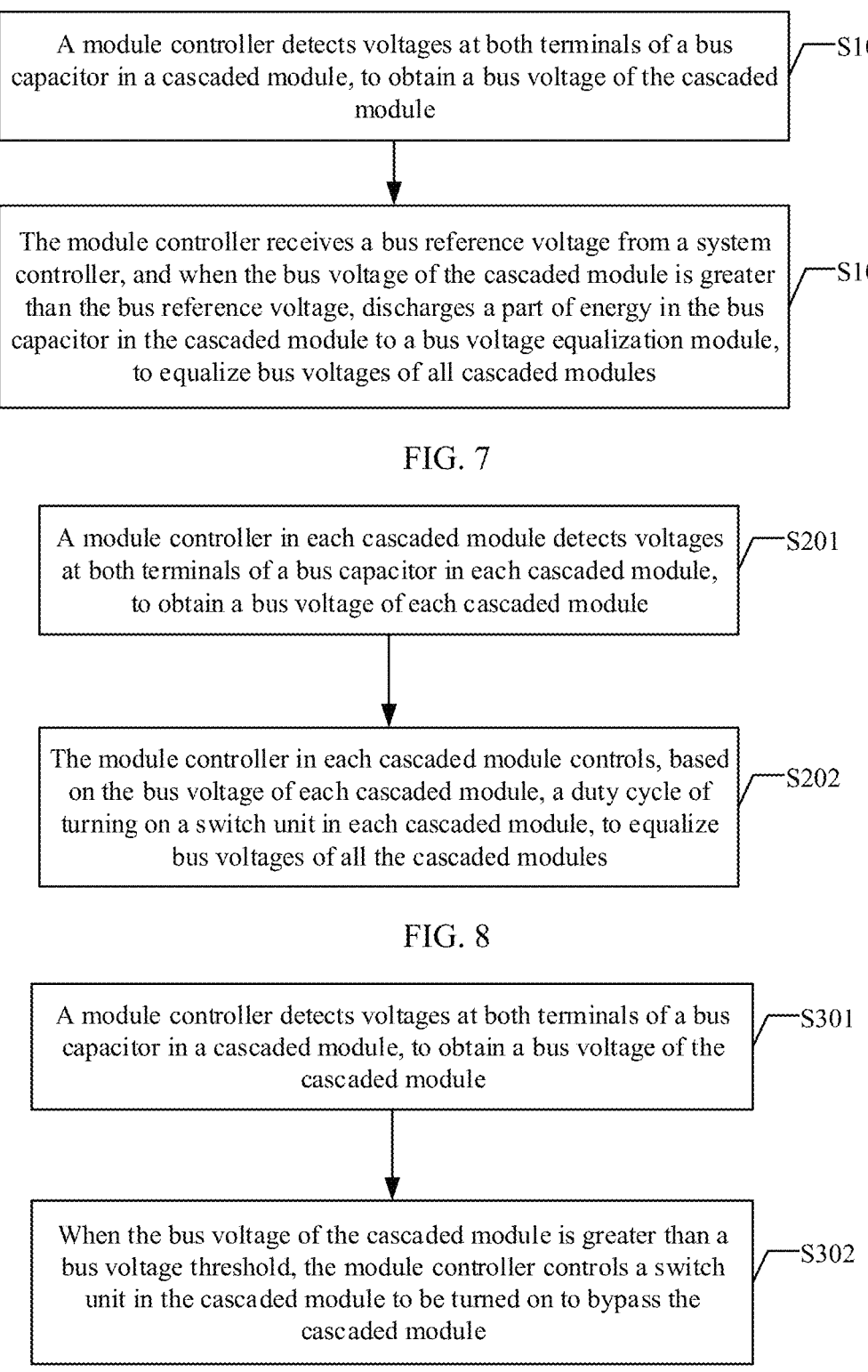

A module controller detects voltages at both terminals of a bus capacitor in a cascaded module, to obtain a bus voltage of the cascaded module ⟋—S101

The module controller receives a bus reference voltage from a system controller, and when the bus voltage of the cascaded module is greater than the bus reference voltage, discharges a part of energy in the bus capacitor in the cascaded module to a bus voltage equalization module, to equalize bus voltages of all cascaded modules ⟋—S102

FIG. 7

A module controller in each cascaded module detects voltages at both terminals of a bus capacitor in each cascaded module, to obtain a bus voltage of each cascaded module ⟋—S201

The module controller in each cascaded module controls, based on the bus voltage of each cascaded module, a duty cycle of turning on a switch unit in each cascaded module, to equalize bus voltages of all the cascaded modules ⟋—S202

FIG. 8

A module controller detects voltages at both terminals of a bus capacitor in a cascaded module, to obtain a bus voltage of the cascaded module ⟋—S301

When the bus voltage of the cascaded module is greater than a bus voltage threshold, the module controller controls a switch unit in the cascaded module to be turned on to bypass the cascaded module ⟋—S302

FIG. 9

SOLID-STATE TRANSFORMER AND BUS VOLTAGE EQUALIZATION METHOD FOR SOLID-STATE TRANSFORMER

CROSS-REFERENCE TO RELATED APPLICATIONS

This application is a continuation of International Application No. PCT/CN2021/074367, filed on Jan. 29, 2021, the disclosure of which is hereby incorporated by reference in its entirety.

TECHNICAL FIELD

This application relates to the field of power electronics technologies, and in particular, to a solid-state transformer and a bus voltage equalization method for a solid-state transformer.

BACKGROUND

To resolve problems that a conventional power transformer in a power supply and distribution system has an excessively large size, cannot stabilize an output voltage, and cannot improve electric energy quality, a solid-state transformer (SST) replaces the conventional power transformer in the power supply and distribution system as the solid-state transformer features a small size and capabilities of maintaining stability of an output voltage and improving a power factor and a current harmonic index on an input side, and has relatively great development potential.

Currently, an input of the solid-state transformer is a medium and high voltage grid with a high voltage level. An existing power electronics device cannot meet a requirement of the solid-state transformer for a voltage level, and therefore a manner in which a plurality of modules are cascaded is usually used to resolve a problem that a single module has an insufficient voltage level. However, modules in the solid-state transformer differ in device parameter (for example, differ in capacitor parameter, drive parameter, or load size), resulting in an imbalance between bus voltages of the modules in a startup process. Consequently, a control power supply system of each module works abnormally (for example, is frequently started up and shut down), and even the solid-state transformer cannot work normally due to an overvoltage failure of the bus voltage. In this case, as shown in FIG. 1, a direct current (DC)/DC topology in which energy flows bidirectionally is used to equalize the bus voltages of the modules. However, there are relatively high costs, and the bus voltages of the modules cannot be equalized when the solid-state transformer cannot work normally, and consequently there is low applicability.

SUMMARY

This application provides a solid-state transformer and a bus voltage equalization method for a solid-state transformer. Bus voltages of cascaded modules may be equalized by using a bus voltage equalization module. In this way, there are lower costs and higher applicability.

According to a first aspect, this application provides a solid-state transformer. The solid-state transformer may include a plurality of cascaded modules and a bus voltage equalization module. Input terminals of all the cascaded modules are connected in series, and output terminals of all the cascaded modules are connected in parallel, and are used as a parallel output terminal of the solid-state transformer.

The cascaded module may include a bus capacitor (for example, all capacitors that are connected in series to each other on a direct current bus). The bus voltage equalization module is connected in parallel to the parallel output terminal of the solid-state transformer, in other words, the plurality of cascaded modules share a bus voltage equalization module. The bus voltage equalization module may include a load, a switching device, and/or another device. The bus voltage equalization module is configured to consume a part of energy in the bus capacitor in each cascaded module, to equalize bus voltages of all the cascaded modules (in other words, to ensure that the bus voltages of all the cascaded modules are consistent or the same). In this application, voltages at both terminals of the bus capacitor in each cascaded module may be referred to as a bus voltage of each cascaded module. In this application, a part of energy in the bus capacitor in each cascaded module may be consumed by using the bus voltage equalization module, to equalize the bus voltages of all the cascaded modules. In this way, there are lower costs and higher applicability.

In an embodiment, the bus voltage equalization module may include a load, and the load may be connected in parallel to the parallel output terminal of the solid-state transformer, to consume a part of energy in the bus capacitor in each cascaded module. In other words, the load may be added to the parallel output terminal of the solid-state transformer, so that the load consumes a part of energy in the bus capacitor in each cascaded module, to equalize the bus voltages of all the cascaded modules. In this way, there are lower costs and higher applicability.

In an embodiment, each cascaded module may further include a module controller. A module controller in any cascaded module is configured to: when voltages at both terminals of a bus capacitor in any cascaded module are greater than a bus reference voltage, discharge a part of energy, in the bus capacitor, other than energy corresponding to the bus reference voltage to the load. The bus reference voltage is an average bus voltage of the bus voltages of all the cascaded modules, a minimum bus voltage in the bus voltages of all the cascaded modules, or another bus voltage value determined based on the bus voltages of all the cascaded modules. In the solid-state transformer provided in this application, a part of energy that is redundant in the bus capacitor may be discharged to the load by using the module controller, to equalize the bus voltages of all the cascaded modules. In this way, there are lower costs and higher applicability.

In an embodiment, each cascaded module further includes a module controller. The module controller in each cascaded module is configured to discharge a part of energy in the bus capacitor in each cascaded module to the load based on the bus voltage of each cascaded module. A part of energy discharged from a bus capacitor in a first cascaded module in the plurality of cascaded modules is greater than or equal to a part of energy discharged from a bus capacitor in a second cascaded module in the plurality of cascaded modules, and a bus voltage of the first cascaded module is greater than a bus voltage of the second cascaded module. In other words, a part of energy discharged from a bus capacitor in a cascaded module (for example, the first cascaded module) with a relatively high bus voltage is greater than or equal to a part of energy discharged from a bus capacitor in a cascaded module (for example, the second cascaded module) with a relatively low bus voltage. In the solid-state transformer provided in this application, a part of energy in the bus capacitor in each cascaded module may be discharged to the load by using each module controller, to equalize the bus voltages of all the cascaded modules. In this way, there are lower costs and higher applicability.

In an embodiment, the bus voltage equalization module may further include a switching device. The switching device and the load may be connected in series and then connected in parallel to the parallel output terminal of the solid-state transformer. In other words, a series branch including the switching device and the load is added to the parallel output terminal of the solid-state transformer. The module controller in each cascaded module is further configured to turn on the switching device before discharging a part of energy in the bus capacitor in each cascaded module to the load. It may be understood that the module controller in each cascaded module is configured to: turn on the switching device based on the bus voltage of each cascaded module, and discharge a part of energy in the bus capacitor in each cascaded module to the load. In the solid-state transformer provided in this application, the switching device may be turned on, and a part of energy in the bus capacitor in each cascaded module may be discharged to the load, to equalize the bus voltages of all the cascaded modules, so that the solid-state transformer works normally. In addition, efficiency of equalizing the bus voltages may be improved. In this way, there are lower costs and higher applicability.

According to a second aspect, this application provides a solid-state transformer. The solid-state transformer may include a plurality of cascaded modules and a plurality of bus voltage equalization modules. Input terminals of all the cascaded modules are connected in series, and output terminals of all the cascaded modules are connected in parallel, and are used as a parallel output terminal of the solid-state transformer. A bus capacitor in one of the plurality of cascaded modules may be directly or indirectly connected to one bus voltage equalization module. In other words, one cascaded module corresponds to one bus voltage equalization module. Each bus voltage equalization module may be configured to consume a part of energy in a bus capacitor in each cascaded module, to equalize bus voltages of all the cascaded modules. In this application, a part of energy in the bus capacitor in each cascaded module may be consumed by using each bus voltage equalization module, to equalize the bus voltages of all the cascaded modules. In this way, there are lower costs and higher applicability.

In an embodiment, any one of the plurality of cascaded modules further includes a control power supply, and a bus voltage equalization module in the any cascaded module may be indirectly connected to a bus capacitor in the any cascaded module by using the control power supply in the any cascaded module. Herein, the control power supply in the any cascaded module may obtain power from the bus capacitor in the any cascaded module.

In an embodiment, each cascaded module further includes a module controller, and the bus voltage equalization module may include a load and a switching device that are connected in series. A module controller in the any cascaded module is configured to: when voltages at both terminals of the bus capacitor in the any cascaded module are greater than a bus reference voltage, turn on the switching device, and discharge a part of energy, in the bus capacitor, other than energy corresponding to the bus reference voltage to the load. The bus reference voltage is an average bus voltage of the bus voltages of all the cascaded modules, a minimum bus voltage in the bus voltages of all the cascaded modules, or another bus voltage value determined based on the bus voltages of all the cascaded modules. In the solid-state transformer provided in this application, a part of energy that is redundant in the bus capacitor may be discharged to the load corresponding to the any cascaded module by using the any module controller, to equalize the bus voltages of all the cascaded modules. In this way, there are lower costs and higher applicability.

In an embodiment, each cascaded module further includes a module controller, and the bus voltage equalization module includes a load and a switching device that are connected in series. The module controller in each cascaded module is configured to turn on the switching device in each cascaded module based on a bus voltage of each cascaded module, and discharge a part of energy in the bus capacitor in each cascaded module to the load in each cascaded module. A part of energy discharged from a bus capacitor in a first cascaded module in the plurality of cascaded modules is greater than or equal to a part of energy discharged from a bus capacitor in a second cascaded module in the plurality of cascaded modules, and a bus voltage of the first cascaded module is greater than a bus voltage of the second cascaded module. In other words, a part of energy discharged from a bus capacitor in a cascaded module (for example, the first cascaded module) with a relatively high bus voltage is greater than or equal to a part of energy discharged from a bus capacitor in a cascaded module (for example, the second cascaded module) with a relatively low bus voltage. In the solid-state transformer provided in this application, a part of energy in the bus capacitor in each cascaded module may be discharged to the load corresponding to each cascaded module by using each module controller, to equalize the bus voltages of all the cascaded modules. In this way, there are lower costs and higher applicability.

According to a third aspect, this application provides a bus voltage equalization method for a solid-state transformer. The method is applicable to a module controller in each cascaded module in the solid-state transformer provided in any one of the first aspect to the fourth possible implementation of the first aspect and the second aspect to the third possible implementation of the second aspect. In the method, the module controller detects voltages at both terminals of a bus capacitor in the cascaded module, to obtain a bus voltage of the cascaded module. The module controller receives a bus reference voltage from a system controller, and when the bus voltage of the cascaded module is greater than the bus reference voltage, discharges a part of energy in the bus capacitor in the cascaded module to a bus voltage equalization module, to equalize bus voltages of all the cascaded modules. The bus reference voltage is an average bus voltage of the bus voltages of all the cascaded modules, a minimum bus voltage in the bus voltages of all the cascaded modules, or another bus voltage value determined based on the bus voltages of all the cascaded modules.

According to a fourth aspect, this application provides a bus voltage equalization method for a solid-state transformer. The solid-state transformer may include a plurality of cascaded modules, and the cascaded module may include a bus capacitor, a switch unit, and a module controller. In the method, a module controller in each cascaded module detects voltages at both terminals of a bus capacitor in each cascaded module, to obtain a bus voltage of each cascaded module. The module controller in each cascaded module controls, based on the bus voltage of each cascaded module, a duty cycle of turning on a switch unit in each cascaded module, to equalize bus voltages of all the cascaded modules. In this application, the bus voltages of all the cascaded modules may be equalized by controlling the duty cycle of turning on the switch unit in each cascaded module and no bus voltage equalization module needs to be added. In this way, there are lower costs and higher applicability.

According to a fifth aspect, this application provides a bus voltage equalization method for a solid-state transformer. The solid-state transformer may include a plurality of cascaded modules, and the cascaded module may include a bus capacitor, a switch unit, and a module controller. In the method, the module controller detects voltages at both terminals of a bus capacitor in the cascaded module, to obtain a bus voltage of the cascaded module. When the bus voltage of the cascaded module is greater than a bus voltage threshold, the module controller controls the switch unit in the cascaded module to be turned on to bypass the cascaded module. In this application, a case in which electrolyte is overflowed from the bus capacitor may be avoided to protect an internal circuit of the solid-state transformer. In this way, there is higher applicability.

In this application, a part of energy in the bus capacitor in each cascaded module may be consumed by using the bus voltage equalization module, to equalize the bus voltages of all the cascaded modules, so that the solid-state transformer works normally. In this way, there are lower costs and higher applicability.

BRIEF DESCRIPTION OF DRAWINGS

FIG. 7 is a schematic flowchart of a bus voltage equalization method for a solid-state transformer according to an embodiment of this application;

FIG. 8 is another schematic flowchart of a bus voltage equalization method for a solid-state transformer according to an embodiment of this application; and FIG. 9 is still another schematic flowchart of a bus voltage equalization method for a solid-state transformer according to an embodiment of this application.

DESCRIPTION OF EMBODIMENTS

Figure 1:
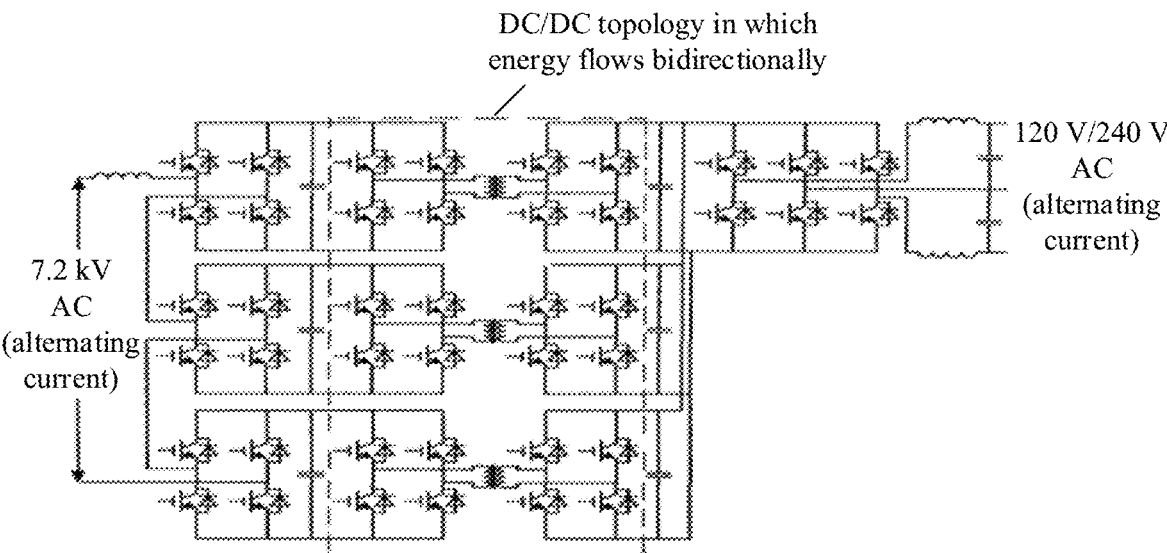
FIG. 1 is a schematic diagram of a system structure of a solid-state transformer.

A solid-state transformer may also be referred to as an electronic power transformer (EPT) or an intelligent transformer, and is static electrical equipment that converts electric energy with an electric power characteristic into electric energy with another electric power characteristic by combining a power electronic conversion technology with a high-frequency electric energy conversion technology based on an electromagnetic induction principle. The solid-state transformer may flexibly control a current on a primary side, a voltage on a secondary side, and power. In addition, when the solid-state transformer is applied to an electric power system, electric energy quality may be improved, system stability may be enhanced, a flexible power transmission mode may be implemented, and power flow may be controlled in real time in the electricity market. A solid-state transformer provided in this application is applicable to a plurality of application fields such as the new energy intelligent micro-grid field, the power transmission and distribution field, or the new energy field (for example, the grid-connected photovoltaic field or the grid-connected wind power generation field). This may be specifically determined based on an actual application scenario, and is not limited herein.

The solid-state transformer provided in this application may include a plurality of cascaded modules and at least one bus voltage equalization module (namely, one or more bus voltage equalization modules). Input terminals of all the cascaded modules are connected in series, and output terminals of all the cascaded modules are connected in parallel, and are used as a parallel output terminal of the solid-state transformer. When the solid-state transformer includes one bus voltage equalization module, the one bus voltage equalization module may be connected in parallel to the parallel output terminal of the solid-state transformer, in other words, the plurality of cascaded modules share a bus voltage equalization module. When the solid-state transformer includes a plurality of bus voltage equalization modules, a bus capacitor in one cascaded module is connected to one bus voltage equalization module, in other words, one cascaded module corresponds to one bus voltage equalization module. The at least one bus voltage equalization module may consume a part of energy in a bus capacitor in each cascaded module, to equalize bus voltages of all the cascaded modules. According to the solid-state transformer provided in this application, a part of energy in the bus capacitor in each cascaded module may be consumed by using the at least one bus voltage equalization module, to equalize the bus voltages of all the cascaded modules. In this way, there are lower costs and higher applicability. The solid-state transformer provided in this application is applicable to different application scenarios such as a grid-connected photovoltaic power supply scenario, a grid-connected wind power supply scenario, or a fast charging scenario for an electric vehicle. Description is provided below by using the fast charging scenario for an electric vehicle as an example. Details are not described herein.

Figure 2:
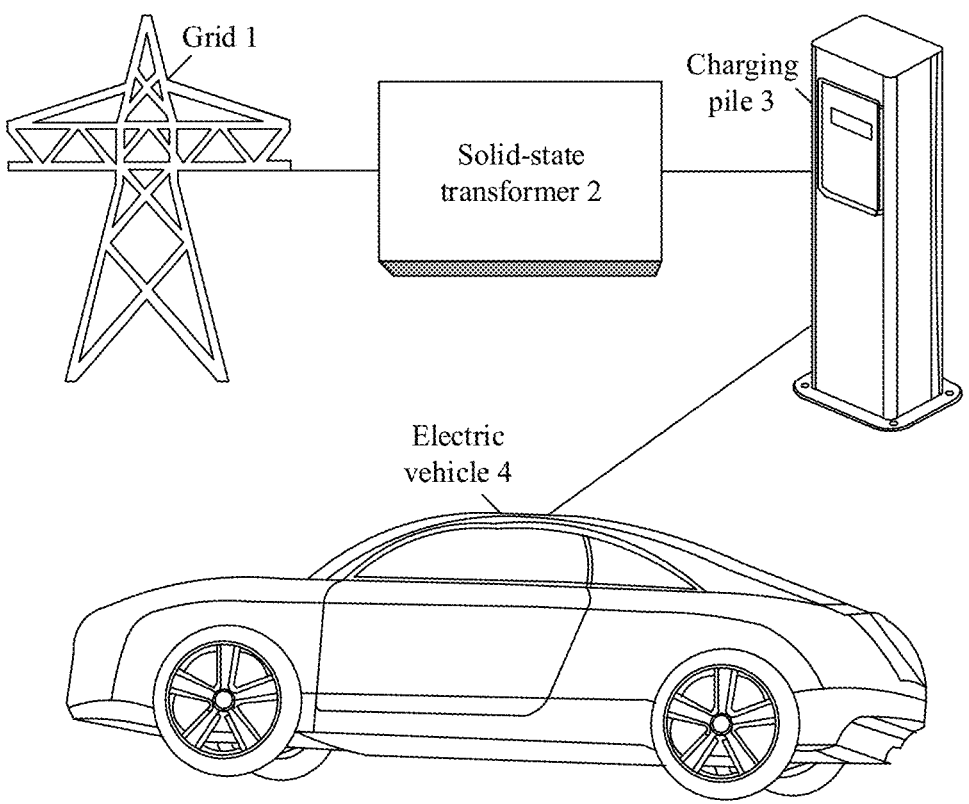
FIG. 2 is a schematic diagram of an application scenario of a solid-state transformer according to an embodiment of this application.

FIG. 2 is a schematic diagram of an application scenario of a solid-state transformer according to an embodiment of this application. As shown in FIG. 2, a medium and high voltage alternating current grid (for example, a grid 1) may input an alternating current voltage to the solid-state transformer (for example, a solid-state transformer 2). The solid-state transformer 2 may equalize bus voltages of a plurality of cascaded modules based on a bus voltage equalization module to work normally, and perform power conversion on the alternating current voltage provided by the grid 1 to obtain a specific direct current voltage to supply power to a direct current load (for example, a direct current charging pile), or perform power conversion on the alternating current voltage provided by the grid 1 to obtain a specific alternating current voltage to supply power to an alternating current load (for example, an alternating current charging pile). The direct current charging pile (for example, a charging pile 3) herein may be a power supply apparatus that is fixedly installed outside an electric vehicle (for example, an electric vehicle 4) and that provides a direct current power source for a power battery of the non-vehicle-mounted electric vehicle 4. In this case, the charging pile 3 (namely, a direct current charging pile) supplies power to the electric vehicle 4 by using a three-phase four-wire system, and therefore may provide sufficient power for the electric vehicle 4. In addition, there is a wide adjustment range for a direct current voltage and a current output by the charging pile 3, and therefore the charging pile 3 may fast charge the electric vehicle 4. Optionally, the alternating current charging pile may be alternatively directly connected to the grid 1 to charge the electric vehicle 4. This may be specifically determined based on an actual application scenario, and is not limited herein.

The solid-state transformer provided in this application and a working principle of the solid-state transformer are described below with reference to FIG. 3 to FIG. 6 and by using examples.

Figure 3:
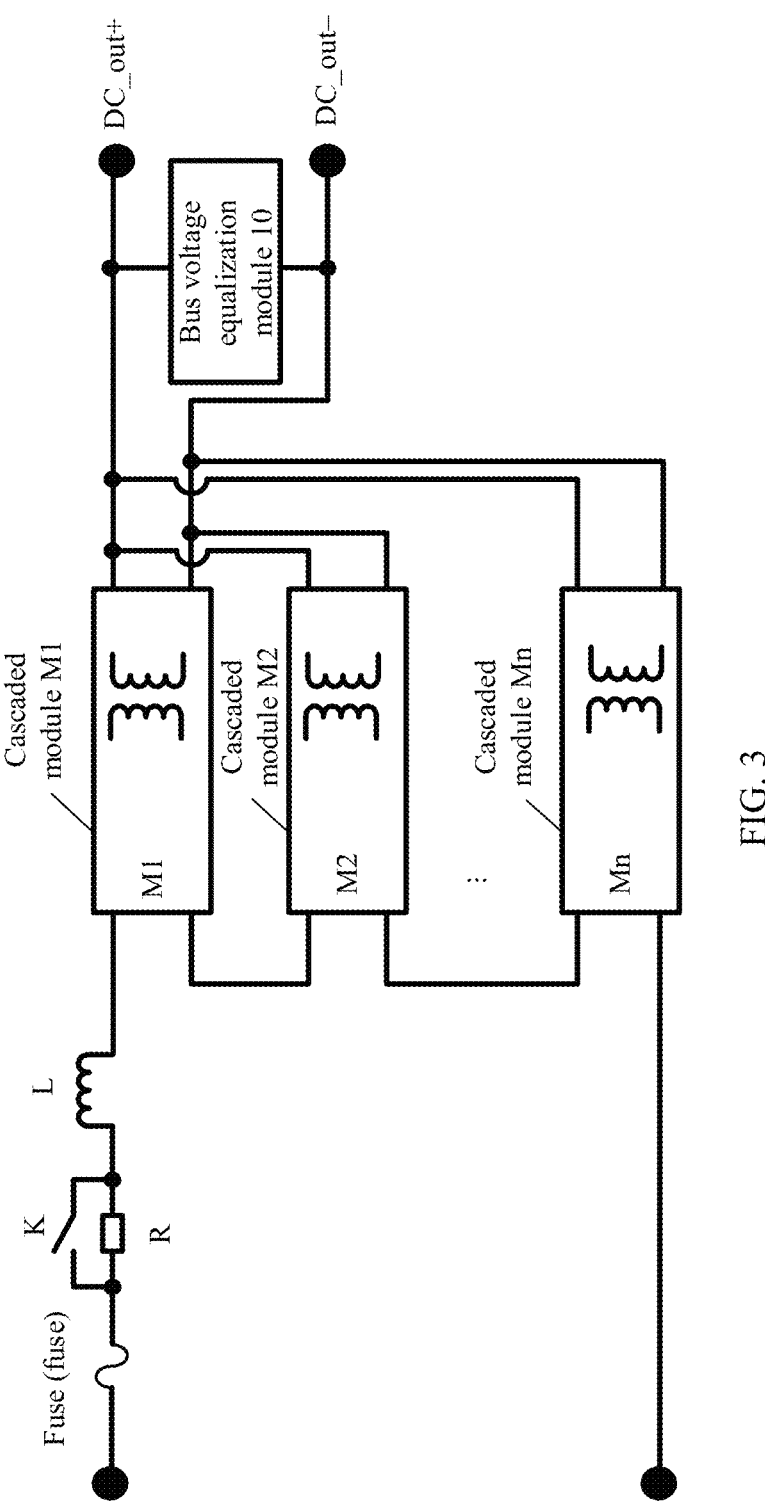
FIG. 3 is a schematic diagram of a circuit of a solid-state transformer according to an embodiment of this application.

FIG. 3 is a schematic diagram of a circuit of a solid-state transformer according to an embodiment of this application. As shown in FIG. 3, the solid-state transformer may include a plurality of cascaded modules (for example, a cascaded module M1 to a cascaded module Mn) and a bus voltage equalization module (for example, a bus voltage equalization module 10). In this application, one or more functional modules and/or hardware devices, in the solid-state transformer, that have a function of equalizing bus voltages of all the cascaded modules are collectively referred to as the bus voltage equalization module. For ease of description, description is provided below by using an example in which the plurality of cascaded modules are the cascaded module M1 to the cascaded module Mn. Details are not described herein. Input terminals of the cascaded module M1 to the cascaded module Mn are connected in series, and output terminals of the cascaded module M1 to the cascaded module Mn are connected in parallel, and are used as a parallel output terminal (for example, a parallel output terminal DC_out+ and a parallel output terminal DC_out−) of the solid-state transformer. Each of the cascaded module M1 to the cascaded module Mn may include a bus capacitor, and the bus capacitor may be understood as a plurality of capacitors that are connected in series to each other on a direct current bus. The bus voltage equalization module 10 may be connected in parallel to the parallel output terminal DC_out+ and the parallel output terminal DC_out−, which may indicate that the cascaded module M1 to the cascaded module Mn share the bus voltage equalization module 10. Optionally, the solid-state transformer may further include a fuse (fuse), a resistor R, a switching device K, and an inductor L. The fuse is connected in series to the resistor R and the inductor L, and the switching device K is connected in parallel to both terminals of the resistor R. When a current rises abnormally to a specific degree, the fuse herein may blow to cut off the current, to ensure that the solid-state transformer runs safely.

Figure 4:
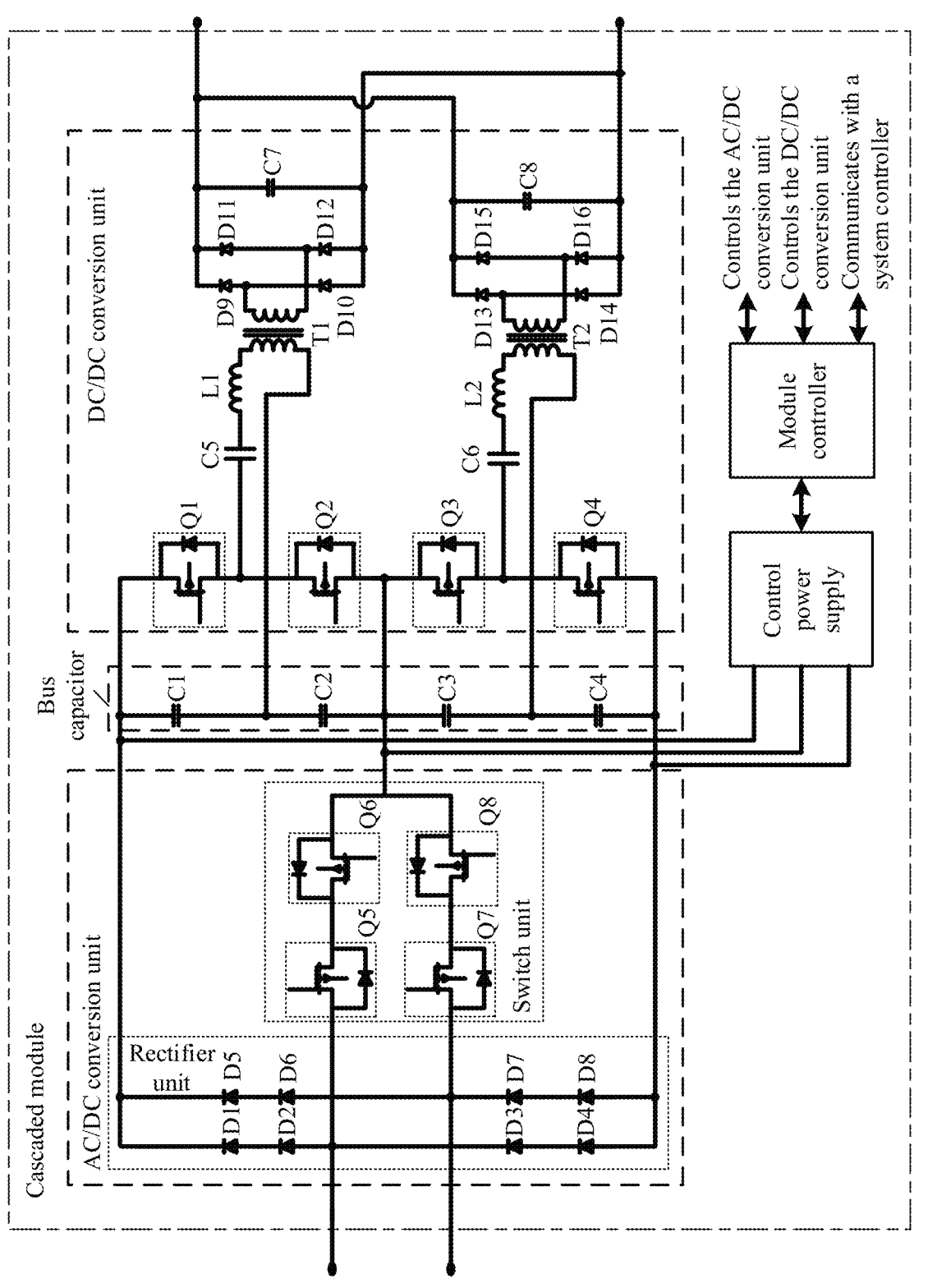
FIG. 4 is a schematic diagram of a circuit of a cascaded module according to an embodiment of this application.

Further, FIG. 4 is a schematic diagram of a circuit of a cascaded module according to an embodiment of this application. As shown in FIG. 4, any one of the cascaded module M1 to the cascaded module Mn shown in FIG. 3 may include an alternating current (AC)/direct current (DC) conversion unit (which may also be referred to as an AC/DC converter), a bus capacitor (for example, a bus capacitor C1 to a bus capacitor C4 that are connected in series), a DC/DC conversion unit (which may also be referred to as a DC/DC converter), a control power supply, and a module controller. The AC/DC conversion unit and the bus capacitor C1 to the bus capacitor C4 that are connected in series are connected in parallel, and the bus capacitor C1 to the bus capacitor C4 that are connected in series and the DC/DC conversion unit may be connected in parallel. In addition, an input terminal of the AC/DC conversion unit is an input terminal of the cascaded module, and an output terminal of the DC/DC conversion unit is an output terminal of the cascaded module. Optionally, the cascaded module may further include a DC/AC conversion unit (which may also be referred to as a DC/AC converter). The DC/AC conversion unit and the DC/DC conversion unit may be connected in parallel, and an output terminal of the DC/AC conversion unit may be used as the output terminal of the cascaded module. This may be specifically determined based on an actual application scenario, and is not limited herein. A power conversion unit (for example, the AC/DC conversion unit, the DC/DC conversion unit, or the DC/AC conversion unit) herein may be one or more functional modules or hardware devices in the cascaded module.

As shown in FIG. 4, the AC/DC conversion unit may include a rectifier unit and a switch unit. The rectifier unit includes a diode D1 to a diode D8. The diode D1 to a diode D4 are connected in series, a diode D5 to the diode D8 are connected in series, and a series branch that includes the diode D1 to the diode D4 and a series branch that includes the diode D5 to the diode D8 are connected in parallel. The switch unit includes a switch Q5 to a switch Q8. A source of the switch Q5 is connected to a diode D2 and a diode D3, a drain of the switch Q5 is connected to a drain of a switch Q6, a source of the switch Q6 is connected to a source of the switch Q8, a bus capacitor C2, and a bus capacitor C3, a drain of the switch Q8 is connected to a drain of a switch Q7, and a source of the switch Q7 is connected to a diode D6 and a diode D7.

As shown in FIG. 4, the DC/DC conversion unit includes a switch Q1 to a switch Q4, a capacitor C5 to a capacitor C8, an inductor L1 and an inductor L2, a transformer T1 and a transformer T2, and a diode D9 to a diode D16. The switch Q1 to the switch Q4 are connected in series, and then are connected in parallel to a series branch that includes the bus capacitor C1 to the bus capacitor C4. A drain of the switch Q1 is connected to the capacitor C1, a source of the switch Q1 is connected to a drain of a switch Q2 and one terminal of the capacitor C5, a source of the switch Q2 is connected to a drain of a switch Q3 and the capacitor C2, a source of the switch Q3 is connected to one terminal of a capacitor C6 and a drain of the switch Q4, and a source of the switch Q4 is connected to the capacitor C4. The other terminal of the capacitor C5 (namely, a resonant capacitor) is connected to one terminal of the inductor L1 (namely, an equivalent inductor), a primary side (namely, an input terminal) of the transformer T1 is connected to the other terminal of the inductor L1, the capacitor C1, and the capacitor C2, and a secondary side (namely, an output terminal) of the transformer T1 is connected to the diode D9 and a diode D12. The diode D9 and a diode D10 are connected in series, a diode D11 and the diode D12 are connected in parallel, and a series branch that includes the diode D9 and the diode D10 and a series branch that includes the diode D11 and the diode D12 are connected in parallel. A capacitor C7 (a filter capacitor) and the series branch that includes the diode D11 and the diode D12 are connected in parallel. The other terminal of the capacitor C6 (namely, a resonant capacitor) is connected to one terminal of the inductor L2 (namely, an equivalent inductor), a primary side (namely, an input terminal) of the transformer T2 is connected to the other terminal of the inductor L2, the capacitor C3, and the capacitor C4, and the secondary side (namely, the output terminal) of the transformer T1 is connected to a diode D13 and a diode D16. The diode D13 and a diode D14 are connected in series, a diode D15 and the diode D16 are connected in series, and a series branch that includes the diode D13 and the diode D14 and a series branch that includes the diode D15 and the diode D16 are connected in parallel. The capacitor C8 (a filter capacitor) and a series branch that includes the diode D11, the diode D15, and the diode D16 are connected in parallel. An output terminal obtained after the capacitor C8 and the capacitor C7 are connected in parallel is the output terminal of the cascaded module. The DC/DC conversion unit is an LLC resonant topology, the capacitor C5, the inductor L1, and the transformer T1 may form an LLC resonant network, and the capacitor C6, the inductor L2, and the transformer T2 may form an LLC resonant network. In this way, it can be implemented that a switch (for example, the switch Q1 and the switch Q2, or the switch Q3 and the switch Q4) on a primary side of a transformer (for example, the transformer T1 or the transformer T2) is closed at a zero voltage in a wide load range, and there is high system efficiency.

In some embodiments, each of the switch Q1 to the switch Q8 may be an insulated gate bipolar transistor (insulated gate bipolar transistor, IGBT for short), a metal-oxide-semiconductor field-effect transistor (MOSFET for short), or a diode that is made of a silicon semiconductor material (silicon, Si), or a third-generation wide bandgap semiconductor material silicon carbide (SiC), gallium nitride (GaN), diamond (diamond), or zinc oxide (ZnO), or another material. This may be specifically determined based on an actual application scenario, and is not limited herein. For example, as shown in FIG. 4, each of the switch Q1 to the switch Q8 may be a MOSFET.

In some embodiments, the module controller may control the control power supply to be turned on or turned off, so that the control power supply provides a direct current input voltage for the bus capacitor C1 to the bus capacitor C4. The module controller may further control the AC/DC conversion unit to be turned on or turned off, and control the DC/DC conversion unit to be turned on or turned off. The module controller may further communicate with a system controller of the solid-state transformer. Optionally, the module controller may be connected to gates of the switch Q1 to the switch Q8. The module controller may generate a control signal used to control the switch Q1 to the switch Q8, and control, based on the control signal, the switch Q1 to the switch Q8 to be closed or open, to turn on or turn off the AC/DC conversion unit and the DC/DC conversion unit. The control signal herein may be a pulse width modulation (PWM) signal for the switch Q1 to the switch Q8, and may be referred to as a PWM signal. For example, 1 in the PWM signal may indicate that the switch is closed, and 0 in the PWM signal may indicate that the switch is open.

In some embodiments, the bus voltage equalization module 10 may include a load. The load may be connected in parallel to the parallel output terminal of the solid-state transformer. In other words, the load may be added to the parallel output terminal of the solid-state transformer, and the load may consume a part of energy in the bus capacitor in each of the cascaded module M1 to the cascaded module Mn. When voltages at both terminals of a bus capacitor in any cascaded module (namely, any one of the cascaded module M1 to the cascaded module Mn) are greater than a bus reference voltage, a module controller in the any cascaded module discharges a part of energy (namely, a part of energy that is redundant in the bus capacitor), in the bus capacitor, other than energy corresponding to the bus reference voltage to the load, to equalize bus voltages of the cascaded module M1 to the cascaded module Mn. The bus reference voltage is an average bus voltage of the bus voltages of the cascaded module M1 to the cascaded module Mn, a minimum bus voltage in the bus voltages of the cascaded module M1 to the cascaded module Mn, or another bus voltage value determined based on the bus voltages of the cascaded module M1 to the cascaded module Mn. This may be specifically determined based on an actual application scenario, and is not limited herein.

In some embodiments, the bus voltage equalization module 10 may further include a switching device (in other words, the bus voltage equalization module 10 includes a load and a switching device). The switching device and the load may be connected in series, and then connected in parallel to the parallel output terminal of the solid-state transformer. The switching device herein may control a series branch that includes the switching device and the load to be turned on or turned off. When the solid-state transformer needs the additional load to equalize the bus voltages of the cascaded module M1 to the cascaded module Mn, the switching device may be turned on. On the contrary, when the solid-state transformer does not need the additional load to equalize the bus voltages of the cascaded module M1 to the cascaded module Mn, the switching device may be turned off. In this way, system efficiency of the solid-state transformer is improved.

In some embodiments, the module controller in each of the cascaded module M1 to the cascaded module Mn determines voltages at both terminals of the bus capacitor in each of the cascaded module M1 to the cascaded module Mn, to obtain a bus voltage of each of the cascaded module M1 to the cascaded module Mn, and sends the bus voltage of each of the cascaded module M1 to the cascaded module Mn to the system controller of the solid-state transformer. In this case, the system controller may receive the bus voltage of each of the cascaded module M1 to the cascaded module Mn from the module controller in each of the cascaded module M1 to the cascaded module Mn, determine the average bus voltage of the bus voltages of the cascaded module M1 to the cascaded module Mn, use the average bus voltage as the bus reference voltage, and deliver the bus reference voltage to the module controller in each of the cascaded module M1 to the cascaded module Mn. Optionally, after receiving the bus voltages of the cascaded module M1 to the cascaded module Mn, the system controller may determine the minimum bus voltage in the bus voltages of the cascaded module M1 to the cascaded module Mn, use the minimum bus voltage as the bus reference voltage, and deliver the bus reference voltage to the module controller in each of the cascaded module M1 to the cascaded module Mn. When the bus voltage equalization module includes the load, after receiving the bus reference voltage (for example, the average bus voltage or the minimum bus voltage), the module controller in the any one of the cascaded module M1 to the cascaded module Mn may discharge a part of energy that is redundant in the bus capacitor to the load when a bus voltage of the any cascaded module is greater than the bus reference voltage, to equalize the bus voltages of the cascaded module M1 to the cascaded module Mn.

In some embodiments, when the bus voltage equalization module 10 includes the load, the module controller in each of the cascaded module M1 to the cascaded module Mn may discharge a part of energy in the bus capacitor in each of the cascaded module M1 to the cascaded module Mn to the load based on the bus voltage of each of the cascaded module M1 to the cascaded module Mn, to equalize the bus voltages of the cascaded module M1 to the cascaded module Mn. A part of energy discharged from a bus capacitor in a first cascaded module in the cascaded module M1 to the cascaded module Mn is greater than or equal to a part of energy discharged from a bus capacitor in a second cascaded module in the cascaded module M1 to the cascaded module Mn, and a bus voltage of the first cascaded module is greater than a bus voltage of the second cascaded module. In other words, a part of energy discharged from a bus capacitor in a cascaded module (for example, the first cascaded module) with a relatively high bus voltage is greater than or equal to a part of energy discharged from a bus capacitor in a cascaded module (for example, the second cascaded module) with a relatively low bus voltage. For example, if a bus voltage of the cascaded module M1 is greater than a bus voltage of a cascaded module M2, it may be learned that a part of energy discharged from a bus capacitor in the cascaded module M1 is greater than or equal to a part of energy discharged from a bus capacitor in the cascaded module M2.

Figure 5:
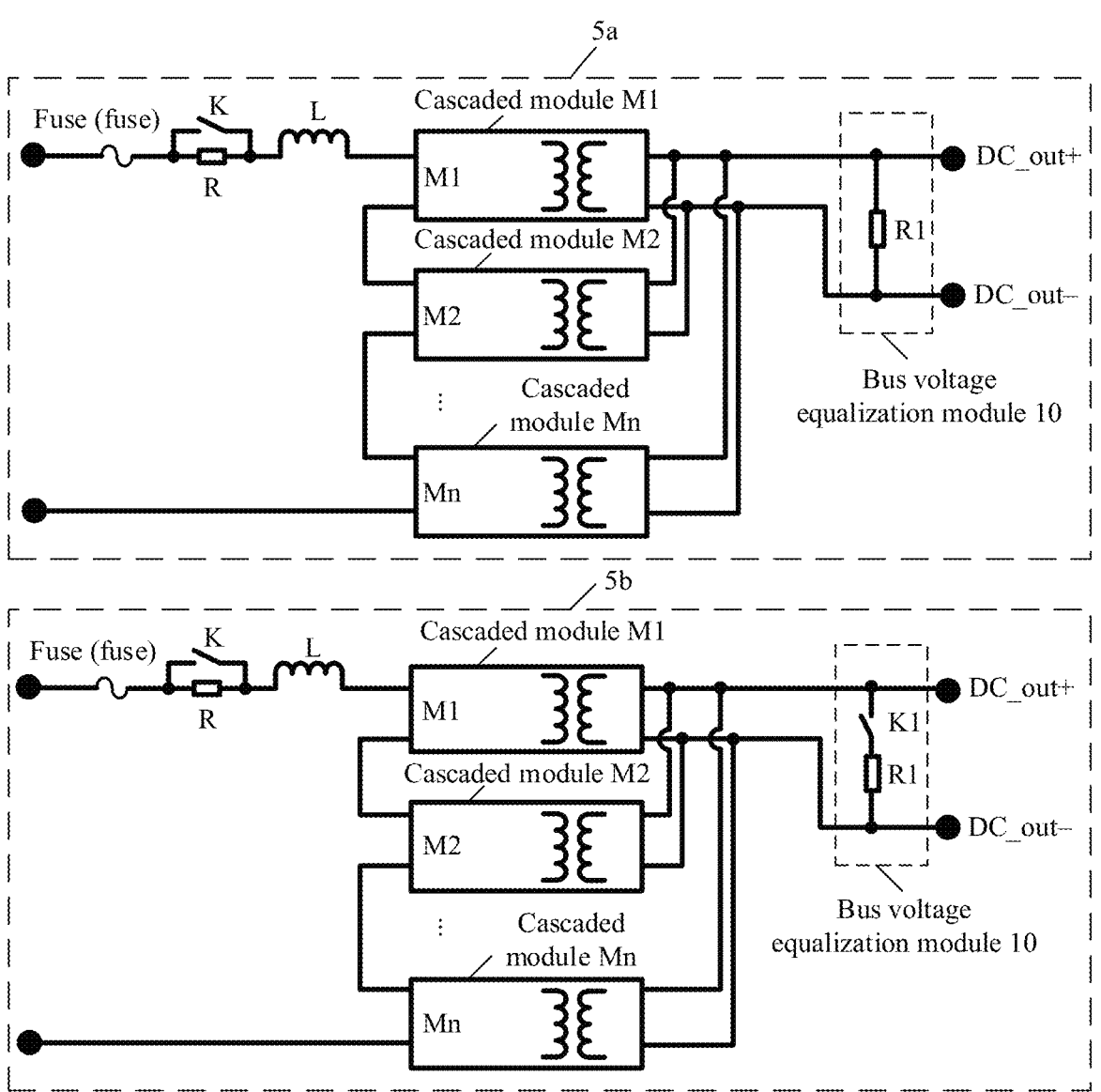
FIG. 5 is another schematic diagram of a circuit of a solid-state transformer according to an embodiment of this application.

FIG. 5 is another schematic diagram of a circuit of a solid-state transformer according to an embodiment of this application. As shown in 5a in FIG. 5, the bus voltage equalization module 10 shown in FIG. 3 may include a load R1, and the load R1 may be connected in parallel to the parallel output terminal DC_out+ and the parallel output terminal DC_out– of the solid-state transformer. After receiving the bus reference voltage (for example, the average bus voltage or the minimum bus voltage) from the system controller, the module controller in the any one (for example, the cascaded module M1) of the cascaded module M1 to the cascaded module Mn may discharge a part of energy that is redundant in the bus capacitor to the load R1 when the bus voltage of the cascaded module M1 is greater than the average bus voltage or the minimum bus voltage, to equalize the bus voltages of the cascaded module M1 to the cascaded module Mn. Optionally, the module controller in each of the cascaded module M1 to the cascaded module Mn may discharge a part of energy in the bus capacitor in each of the cascaded module M1 to the cascaded module Mn to the load R1 based on the bus voltage of each of the cascaded module M1 to the cascaded module Mn, to equalize the bus voltages of the cascaded module M1 to the cascaded module Mn.

As shown in 5b in FIG. 5, the bus voltage equalization module 10 shown in FIG. 3 may include a load R1 and a switching device K1. The load R1 and the switching device K1 may be connected in series, and then connected in parallel to the parallel output terminal DC_out+ and the parallel output terminal DC_out– of the solid-state transformer. In other words, a series branch that includes the load R1 and the switching device K1 is connected in parallel to the parallel output terminal DC_out+ and the parallel output terminal DC_out– of the solid-state transformer. When the solid-state transformer needs the additional load R1 to equalize the bus voltages of the cascaded module M1 to the cascaded module Mn, the switching device K1 may be turned on. On the contrary, when the solid-state transformer does not need the additional load R1 to equalize the bus voltages of the cascaded module M1 to the cascaded module Mn, the switching device K1 may be turned off. In this way, system efficiency of the solid-state transformer is improved, and there is higher applicability.

In some embodiments, if the parallel output terminal DC_out+ and the parallel output terminal DC_out– of the solid-state transformer are already connected to a load, or when the module controller in each cascaded module controls the AC/DC conversion unit in each cascaded module to equalize the bus voltages of all the cascaded modules, the bus voltage equalization module 10 may not be added, or the switching device K1 may be turned off. The module controller in the any one of the cascaded module M1 to the cascaded module Mn may discharge the part of energy, in the bus capacitor, other than the energy corresponding to the bus reference voltage to the load when the bus voltage of the any cascaded module is greater than the bus reference voltage, to equalize the bus voltages of the cascaded module M1 to the cascaded module Mn. Optionally, the module controller in each of the cascaded module M1 to the cascaded module Mn may discharge a part of energy in the bus capacitor in each of the cascaded module M1 to the cascaded module Mn to the load based on the bus voltage of each of the cascaded module M1 to the cascaded module Mn, to equalize the bus voltages of the cascaded module M1 to the cascaded module Mn. Optionally, the module controller in each of the cascaded module M1 to the cascaded module Mn may control, based on the bus voltage of each cascaded module, a duty cycle of turning on the switch Q5 to the switch Q8 in the AC/DC conversion unit in each cascaded module, to equalize the bus voltages of the cascaded module M1 to the cascaded module Mn, so that the solid-state transformer works normally. In this way, there are lower costs and higher applicability.

Figure 6:
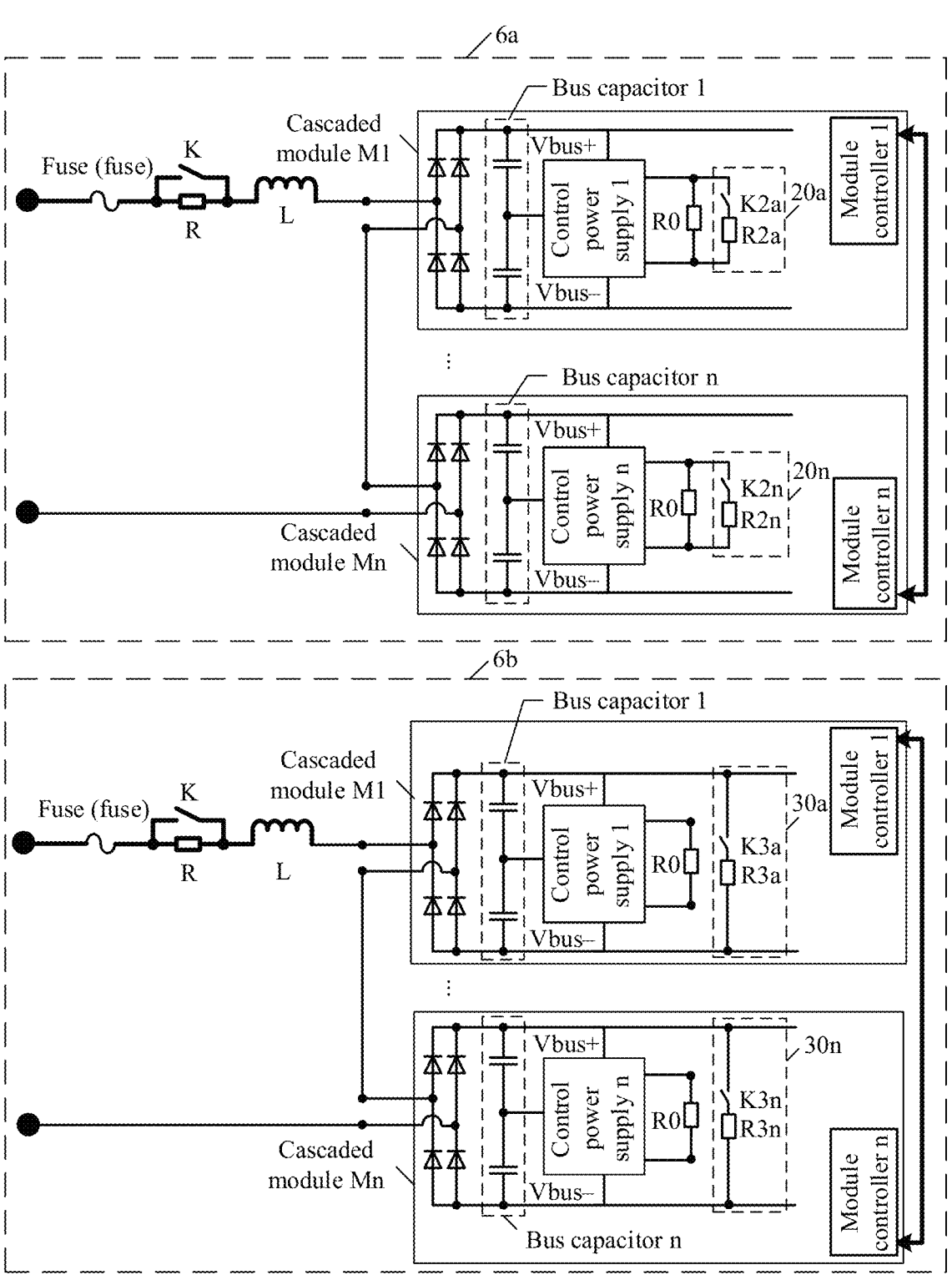
FIG. 6 is still another schematic diagram of a circuit of a solid-state transformer according to an embodiment of this application.

FIG. 6 is still another schematic diagram of a circuit of a solid-state transformer according to an embodiment of this application. As shown in 6a in FIG. 6, the solid-state transformer may include a plurality of cascaded modules (for example, a cascaded module M1 to a cascaded module Mn) and a plurality of bus voltage equalization modules (for example, a bus voltage equalization module 20a to a bus voltage equalization module 20n). For ease of description, description is provided below by using the cascaded module M1 to the cascaded module Mn and the bus voltage equalization module 20a to the bus voltage equalization module 20n as examples. Details are not described herein. A bus capacitor in one of the cascaded module M1 to the cascaded module Mn herein is directly or indirectly connected to one bus voltage equalization module, in other words, one cascaded module corresponds to one bus voltage equalization module. As shown in 6a in FIG. 6, when the cascaded module includes a control power supply, a bus voltage equalization module in any one of the cascaded module M1 to the cascaded module Mn may be indirectly connected to a bus capacitor in the any cascaded module by using a control power supply in the any cascaded module. Voltages at both terminals of a bus capacitor (for example, the following bus capacitor 1 to the following bus capacitor n) are respectively a positive-terminal voltage Vbus+ and a negative-terminal voltage Vbus–, and therefore the voltages (namely, a bus voltage of a cascaded module) at the both terminals of the bus capacitor may be obtained. The bus voltage equalization module 20a to the bus voltage equalization module 20n may respectively consume a part of energy in bus capacitors in the cascaded module M1 to the cascaded module Mn, to equalize bus voltages of the cascaded module M1 to the cascaded module Mn.

In some embodiments, any bus voltage equalization module may include a load and a switching device that are connected in series. When voltages at both terminals of the bus capacitor in the any cascaded module is greater than a bus reference voltage, a module controller in the any cascaded module may turn on the switching device, and discharge a part of energy (namely, a part of energy that is redundant in the bus capacitor), in the bus capacitor, other than energy corresponding to the bus reference voltage to the load, to equalize the bus voltages of the cascaded module M1 to the cascaded module Mn. For example, as shown in 6a in FIG. 6, the cascaded module M1 may include the bus capacitor 1, a control power supply 1, the bus voltage equalization module 20a, and a module controller 1. A back terminal of the control power supply 1 may be connected to a load R0, and the load R0 is connected in parallel to both terminals of the control power supply 1. The bus voltage equalization module 20a may be indirectly connected to the bus capacitor 1 by using the control power supply 1. The bus voltage equalization module 20a may include a load R2a and a switching device K2a that are connected in series. When a bus voltage of the cascaded module M1 is greater than the bus reference voltage, the module controller 1 may turn on the switching device K2a, and discharge a part of energy that is redundant in the bus capacitor 1 to the load R2a. By analogy, the cascaded module Mn may include the bus capacitor n, a control power supply n, the bus voltage equalization module 20n, and a module controller n. A back terminal of the control power supply n may be connected to the load R0, and the load R0 is connected in parallel to both terminals of the control power supply n. The bus voltage equalization module 20n may be indirectly connected to the bus capacitor n by using the control power supply n. The bus voltage equalization module 20n may include a load R2n and a switching device K2n that are connected in series. It should be noted that back terminals of control power supplies in different cascaded modules may be connected in parallel to a same load (for example, the load R0) or different loads. When a bus voltage of the cascaded module Mn is greater than the bus reference voltage, the module controller n may turn on the switching device K2n, and discharge a part of energy that is redundant in the bus capacitor n to the load R2n, to equalize the bus voltages of the cascaded module M1 to the cascaded module Mn.

In some embodiments, each of the load R2a to the load R2n may be an energy-consuming device (for example, a fan). When the bus voltage of the any cascaded module is greater than the bus reference voltage, any one of the module controller 1 to the module controller n may turn on a fan in the cascaded module, or increase a rotation speed of a fan in the cascaded module, to equalize the bus voltages of all the cascaded modules. Optionally, when the bus voltage of the any cascaded module is less than or equal to the bus reference voltage, the module controller in the any cascaded module may directly turn off the switching device. In this way, efficiency of equalizing the bus voltages of all the cascaded modules is improved, and there is higher applicability.

Optionally, in some embodiments, a module controller in each cascaded module may turn on a switching device in each cascaded module based on a bus voltage of each cascaded module, and discharge a part of energy in the bus capacitor in each cascaded module to a load in each cascaded module, to equalize the bus voltages of the cascaded module M1 to the cascaded module Mn. For example, as shown in 6a in FIG. 6, the module controller 1 may turn on the switching device K2a based on the bus voltage (namely, voltages at both terminals of the bus capacitor 1) of the cascaded module M1, and discharge a part of energy in the bus capacitor 1 to the load R2a. By analogy, the module controller n may turn on the switching device K2n based on the bus voltage (namely, voltages at both terminals of the bus capacitor n) of the cascaded module Mn, and discharge a part of energy in the bus capacitor n to the load R2n, to equalize the bus voltages of the cascaded module M1 to the cascaded module Mn.

As shown in 6b in FIG. 6, the solid-state transformer may include a plurality of cascaded modules (for example, a cascaded module M1 to a cascaded module Mn) and a plurality of bus voltage equalization modules (for example, a bus voltage equalization module 30a to a bus voltage equalization module 30n). For ease of description, description is provided below by using the cascaded module M1 to the cascaded module Mn and the bus voltage equalization module 30a to the bus voltage equalization module 30n as examples. Details are not described herein. A bus capacitor in one of the cascaded module M1 to the cascaded module Mn herein may be directly connected to one bus voltage equalization module. Voltages at both terminals of a bus capacitor (for example, the following bus capacitor 1 to the following bus capacitor n) are respectively a positive-terminal voltage Vbus+ and a negative-terminal voltage Vbus−, and therefore the voltages (namely, a bus voltage of a cascaded module) at the both terminals of the bus capacitor may be obtained. In the cascaded module M1, the bus voltage equalization module 30a may be directly connected to the bus capacitor 1, and the bus voltage equalization module 30a may include a load R3a and a switching device K3a that are connected in series. When a bus voltage of the cascaded module M1 is greater than a bus reference voltage, a module controller 1 may turn on the switching device K3a, and discharge a part of energy that is redundant in the bus capacitor 1 to the load R3a. By analogy, in the cascaded module Mn, the bus voltage equalization module 30n may be directly connected to the bus capacitor n, and the bus voltage equalization module 30n may include a load R3n and a switching device K3n that are connected in series. When a bus voltage of the cascaded module Mn is greater than the bus reference voltage, a module controller n may turn on the switching device K3n, and discharge a part of energy that is redundant in the bus capacitor n to the load R3n. The module controller 1 to the module controller n may communicate with each other, and the module controller 1 to the module controller n may communicate with a system controller of the solid-state transformer, to determine the bus reference voltage (for example, an average bus voltage or a minimum bus voltage).

Optionally, in some embodiments, the module controller 1 may turn on the switching device K3a based on the bus voltage (namely, voltages at both terminals of the bus capacitor 1) of the cascaded module M1, and discharge a part of energy in the bus capacitor 1 to the load R3a. By analogy, the module controller n may turn on the switching device K3n based on the bus voltage (namely, voltages at both terminals of the bus capacitor n) of the cascaded module Mn, and discharge a part of energy in the bus capacitor n to the load R3n, to equalize the bus voltages of the cascaded module M1 to the cascaded module Mn.

According to the solid-state transformer provided in this application, a part of energy in the bus capacitor in each cascaded module may be consumed by using the at least one bus voltage equalization module, to equalize the bus voltages of all the cascaded modules. In this way, there are lower costs and higher applicability.

FIG. 7 is a schematic flowchart of a bus voltage equalization method for a solid-state transformer according to an embodiment of this application. The method provided in this application is applicable to a module controller in each cascaded module in the solid-state transformer provided in FIG. 3 to FIG. 6. The method includes the following operations S101 and S102:

Operation S101: The module controller detects voltages at both terminals of a bus capacitor in the cascaded module, to obtain a bus voltage of the cascaded module.

Operation S102: The module controller receives a bus reference voltage from a system controller, and when the bus voltage of the cascaded module is greater than the bus reference voltage, discharges a part of energy in the bus capacitor in the cascaded module to a bus voltage equalization module, to equalize bus voltages of all the cascaded modules.

In some embodiments, if the solid-state transformer includes the foregoing cascaded module M1 to cascaded module Mn, module controllers (for example, the foregoing module controller 1 to module controller n) in the cascaded module M1 to the cascaded module Mn may determine bus voltages of the cascaded module M1 to the cascaded module Mn, and respectively send the bus voltages of the cascaded module M1 to the cascaded module Mn to the system controller of the solid-state transformer. Further, any one of the module controller 1 to the module controller n may receive the bus reference voltage from the system controller, and when a bus voltage of the cascaded module is greater than the bus reference voltage, discharge a part of energy in a bus capacitor in the cascaded module to the bus voltage equalization module, to equalize the bus voltages of all the cascaded modules. The bus reference voltage herein may be an average bus voltage determined by the system controller based on the bus voltages of the cascaded module M1 to the cascaded module Mn. Alternatively, the bus reference voltage may be a minimum bus voltage determined by the system controller in the bus voltages of the cascaded module M1 to the cascaded module Mn. Alternatively, the bus reference voltage may be another bus voltage value determined by the system controller based on the bus voltages of all the cascaded modules.

In specific implementation, for more operations performed by the module controller in the bus voltage equalization method for a solid-state transformer provided in this application, refer to the implementations performed by the module controller in the solid-state transformer and the working principle of the solid-state transformer shown in FIG. 3 to FIG. 6. Details are not described herein.

FIG. 8 is another schematic flowchart of a bus voltage equalization method for a solid-state transformer according to an embodiment of this application. The method provided in this application is applicable to the solid-state transformer. The solid-state transformer may include a plurality of cascaded modules (for example, the cascaded module M1 to the cascaded module Mn shown in FIG. 3). The cascaded module may include a bus capacitor, a switch unit, and a module controller shown in FIG. 4. As shown in FIG. 8, the method may include the following operations S201 and S202:

Operation S201: A module controller in each cascaded module detects voltages at both terminals of a bus capacitor in each cascaded module, to obtain a bus voltage of each cascaded module.

Operation S202: The module controller in each cascaded module controls, based on the bus voltage of each cascaded module, a duty cycle of turning on a switch unit in each cascaded module, to equalize bus voltages of all the cascaded modules.

In some embodiments, the switch unit may be a switch unit in the foregoing AC/DC conversion unit, and the switch unit may include a switch Q5 to a switch Q8. The module controller in each cascaded module may generate, based on the bus voltage of each cascaded module, a control signal that is used to control the switch Q5 to the switch Q8 in each cascaded module, and control, based on the control signal, a duty cycle of turning on the switch Q5 to the switch Q8 in each cascaded module, to equalize the bus voltages of all the cascaded modules. In this way, no bus voltage equalization module needs to be added, and there are lower costs and higher applicability.

FIG. 9 is still another schematic flowchart of a bus voltage equalization method for a solid-state transformer according to an embodiment of this application. The method provided in this application is applicable to the solid-state transformer. The solid-state transformer may include a plurality of cascaded modules (for example, the cascaded module M1 to the cascaded module Mn shown in FIG. 3). The cascaded module may include a bus capacitor, a switch unit, and a module controller shown in FIG. 4. As shown in FIG. 9, the method may include the following operations S301 and S302:

Operation S301: The module controller detects voltages at both terminals of the bus capacitor in the cascaded module, to obtain a bus voltage of the cascaded module.

Operation S302: When the bus voltage of the cascaded module is greater than a bus voltage threshold, the module controller controls the switch unit in the cascaded module to be turned on to bypass the cascaded module.

In some embodiments, the switch unit herein may include the switch Q5 to the switch Q8 shown in FIG. 4. When the bus voltage of the cascaded module is greater than the bus voltage threshold, the module controller may generate a control signal that is used to control the switch Q5 to the switch Q8, and control, based on the control signal, the switch Q5 to the switch Q8 in the cascaded module to be closed to bypass the cascaded module. In this case, a fuse in the solid-state transformer is blown, to avoid an overvoltage failure of the bus voltage and overflow of electrolyte in the bus capacitor. In this way, there is higher security and higher applicability.

The foregoing description is merely a specific implementation of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A solid-state transformer, wherein the solid-state transformer comprises a plurality of cascaded modules, each of the plurality of cascaded modules comprising a module controller to control components of the cascaded module to be turned on or off, input terminals of all the cascaded modules are connected in series, output terminals of all the cascaded modules are connected in parallel, and are used as a parallel output terminal of the solid-state transformer, and wherein the solid-state transformer further comprises a bus voltage equalization module and the bus voltage equalization module is connected in parallel to the parallel output terminal of the solid-state transformer, wherein the bus voltage equalization module comprises a load that is connected in parallel to the parallel output terminal of the solid-state transformer; and the bus voltage equalization module is configured to consume a part of energy in a bus capacitor in each cascaded module, to equalize bus voltages of all the cascaded modules, and each module controller is configured to: when voltages at both terminals of the bus capacitor in the respective cascaded module are greater than a bus reference voltage, discharge a part of energy, in the bus capacitor, other than energy corresponding to the bus reference voltage to the load of the bus voltage equalization module.

2. The solid-state transformer according to claim 1, wherein the load is to consume a part of energy in the bus capacitor in each cascaded module.

3. The solid-state transformer according to claim 1, wherein the bus reference voltage is an average bus voltage of the bus voltages of all the cascaded modules or a minimum bus voltage in the bus voltages of all the cascaded modules.

4. The solid-state transformer according to claim 1, wherein a part of energy discharged from a bus capacitor in a first cascaded module in the plurality of cascaded modules is greater than or equal to a part of energy discharged from a bus capacitor in a second cascaded module in the plurality of cascaded modules, and a bus voltage of the first cascaded module is greater than a bus voltage of the second cascaded module.

5. The solid-state transformer according to claim 3, wherein the bus voltage equalization module further comprises a switching device, and the switching device and the load are connected in series; and the module controller in each cascaded module is further configured to turn on the switching device before discharging a part of energy in the bus capacitor in each cascaded module to the load.

6. The solid-state transformer according to claim 4, wherein the bus voltage equalization module further comprises a switching device, and the switching device and the load are connected in series; and the module controller in each cascaded module is further configured to turn on the switching device before discharging a part of energy in the bus capacitor in each cascaded module to the load.

7. The solid-state transformer according to claim 2, wherein the bus reference voltage is an average bus voltage of the bus voltages of all the cascaded modules or a minimum bus voltage in the bus voltages of all the cascaded modules.

8. The solid-state transformer according to claim 2, wherein a part of energy discharged from a bus capacitor in a first cascaded module in the plurality of cascaded modules is greater than or equal to a part of energy discharged from a bus capacitor in a second cascaded module in the plurality of cascaded modules, and a bus voltage of the first cascaded module is greater than a bus voltage of the second cascaded module.

9. A solid-state transformer, wherein the solid-state transformer comprises a plurality of cascaded modules, each of the plurality of cascaded modules comprising a module controller to control components of the cascaded module to be turned on or off, input terminals of all the cascaded modules are connected in series, output terminals of all the cascaded modules are connected in parallel, and are used as a parallel output terminal of the solid-state transformer, and wherein the solid-state transformer further comprises a plurality of bus voltage equalization modules and a bus capacitor in one of the plurality of cascaded modules is connected to one bus voltage equalization module, wherein each bus voltage equalization module comprises a load; and each bus voltage equalization module is configured to consume a part of energy in a bus capacitor in each cascaded module, to equalize bus voltages of all the cascaded modules, and each module controller is configured to: when voltages at both terminals of the bus capacitor in the respective cascaded module are greater than a bus reference voltage, discharge a part of energy, in the bus capacitor, other than energy corresponding to the bus reference voltage to the load of the bus voltage equalization module.

10. The solid-state transformer according to claim 9, wherein any one of the plurality of cascaded modules further comprises a control power supply, and a bus voltage equalization module in the any cascaded module is connected to a bus capacitor in the any cascaded module by using the control power supply in the any cascaded module.

11. The solid-state transformer according to claim 9, wherein the bus voltage equalization module comprises a switching device connected in series to the load of the bus voltage equalization module; and a module controller in the any cascaded module is configured to: when voltages at both terminals of the bus capacitor in the any cascaded module are greater than a bus reference voltage, turn on the switching device, wherein the bus reference voltage is an average bus voltage of the bus voltages of all the cascaded modules or a minimum bus voltage in the bus voltages of all the cascaded modules.

12. The solid-state transformer according to claim 9, wherein the bus voltage equalization module comprises a switching device connected in series to the load of the bus voltage equalization module; and the module controller in each cascaded module is configured to: turn on the switching device in each cascaded module based on a bus voltage of each cascaded module, wherein a part of energy discharged from a bus capacitor in a first cascaded module in the plurality of cascaded modules is greater than or equal to a part of energy discharged from a bus capacitor in a second cascaded module in the plurality of cascaded modules, and a bus voltage of the first cascaded module is greater than a bus voltage of the second cascaded module.

13. The solid-state transformer according to claim 10, wherein the bus voltage equalization module comprises a switching device connected in series to the load of the bus voltage equalization module; and a module controller in the any cascaded module is configured to: when voltages at both terminals of the bus capacitor in the any cascaded module are greater than a bus reference voltage, turn on the switching device, wherein the bus reference voltage is an average bus voltage of the bus voltages of all the cascaded modules or a minimum bus voltage in the bus voltages of all the cascaded modules.

14. The solid-state transformer according to claim 10, wherein the bus voltage equalization module comprises a switching device connected in series to the load of the bus voltage equalization module; and the module controller in each cascaded module is configured to: turn on the switching device in each cascaded module based on a bus voltage of each cascaded module, wherein a part of energy discharged from a bus capacitor in a first cascaded module in the plurality of cascaded modules is greater than or equal to a part of energy discharged from a bus capacitor in a second cascaded module in the plurality of cascaded modules, and a bus voltage of the first cascaded module is greater than a bus voltage of the second cascaded module.

15. A bus voltage equalization method for a solid-state transformer, comprising:

detecting, by a module controller in a cascaded module of a plurality of cascaded modules of the solid-state transformer, voltages at both terminals of a bus capacitor in the cascaded module, to obtain a bus voltage of the cascaded module; and receiving, by the module controller, a bus reference voltage from a system controller, and when the bus voltage of the cascaded module is greater than the bus reference voltage, discharging a part of energy in the bus capacitor in the cascaded module to a load of a bus voltage equalization module, to equalize bus voltages of all the cascaded modules, wherein the bus reference voltage is an average bus voltage of the bus voltages of all the cascaded modules or a minimum bus voltage in the bus voltages of all the cascaded modules.

* * * * *